E. A. KITTELL. 2 Sheets—Sheet 1.

Assignor of five-eighths to B. G. BUTTON, T. N. KELLOGG & W. H. HARTMAN.

FILE.

No. 10,847. Reissued July 5, 1887.

Witnesses

M. E. Fuller

E. G. Siggers

Inventor

Ernest A. Kittell

By his Attorneys

C. A. Crowell

N. PETERS, Photo-Lithographer, Washington, D. C.

2 Sheets—Sheet 2.
E. A. KITTELL.
Assignor of five-eighths to B. G. BUTTON, T. N. KELLOGG & W. H. HARTMAN.
FILE.
No. 10,847. Reissued July 5, 1887.
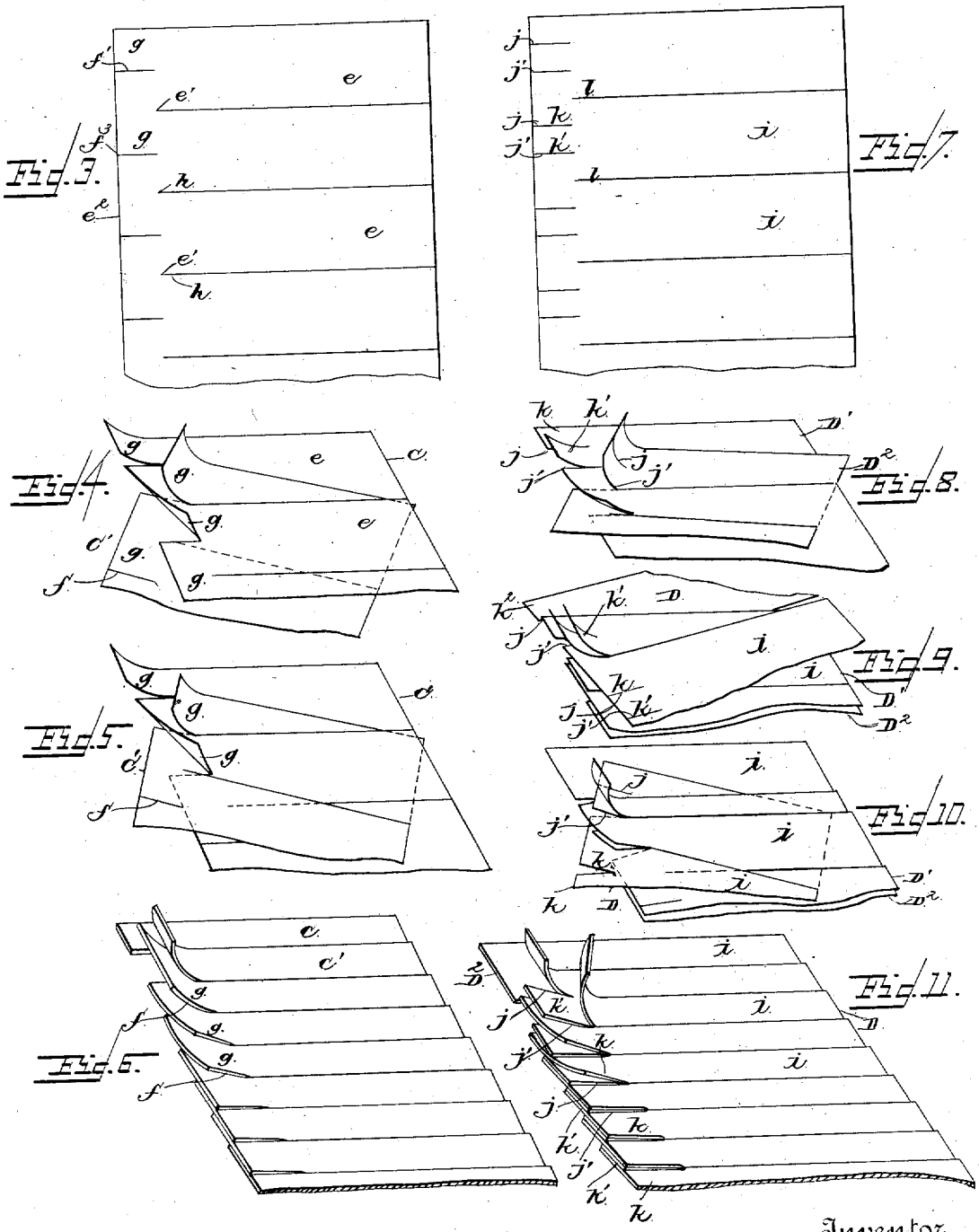
Witnesses
M. Fowler
E. G. Siggers
Inventor
Ernest A. Kittell
By his Attorneys
C. A. Snow & Co
N. PETERS, Photo-Lithographer, Washington, D. C.

UNITED STATES PATENT OFFICE.

ERNEST ALBERT KITTELL, OF WATERLOO, IOWA, ASSIGNOR OF FIVE-EIGHTHS TO BENJ. G. BUTTON, TIMOTHY N. KELLOGG, AND WM. H. HARTMAN, ALL OF SAME PLACE.

FILE.

SPECIFICATION forming part of Reissued Letters Patent No. 10,847, dated July 5, 1887.

Original No. 342,831, dated June 1, 1886. Application for reissue filed September 2, 1886. Serial No. 212,550.

*To all whom it may concern:*

Be it known that I, ERNEST ALBERT KITTELL, a citizen of the United States, residing at Waterloo, in the county of Black Hawk and State of Iowa, have invented a new and useful Improvement in Files, of which the following is a specification, reference being had to the accompanying drawings.

My invention relates to improvements in files especially adapted for use by druggists for filing physicians' prescriptions; and the novelty consists in the construction, combination, and arrangement of parts, substantially as hereinafter fully set forth, and particularly pointed out in the claims.

My invention has for its object the provision of a file which shall compactly file away letters, prescriptions, and the like, take up but a small space, permit of the ready and convenient reference to any prescription, &c., cheap of manufacture, and simple and durable in construction.

I am aware that a file for letters, papers, and the like has been used which consists of a series of strips of paper or the like secured at each of its ends and arranged one below the other down a page or base-board, leaving an intermediate space between each slip, below which the prescription is placed, leaving a small portion thereof exposed; but this device soon becomes unsightly and bulky in appearance and will not compactly file the prescription and does not permit of the ready reference to the prescriptions, &c.

Figure 1:
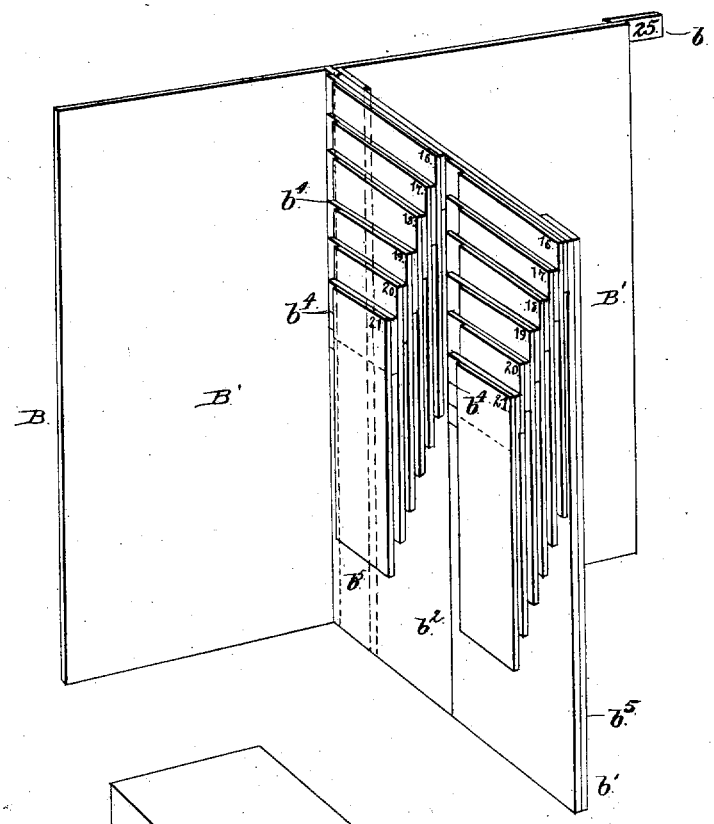
Figure 2:
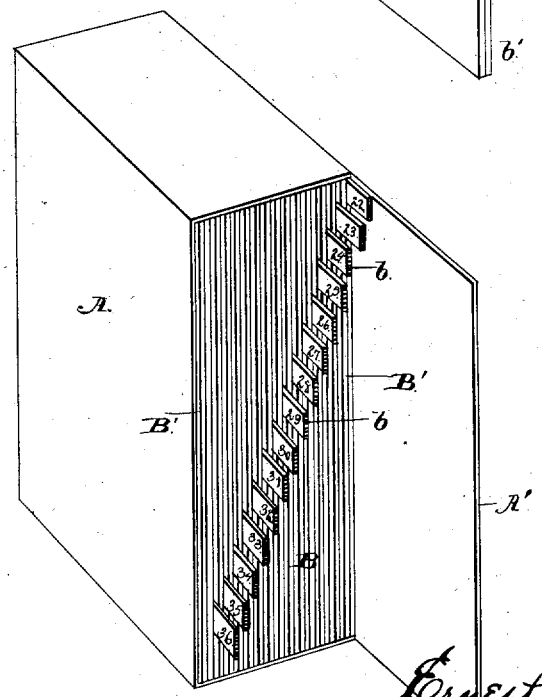

In the drawings hereto annexed, Figure 1 is a perspective view of one of the sections of my file with the cover or leaf thereof extended. Fig. 2 is a like view of an inclosing-case containing a number of sections shown in Fig. 1, indexed or numbered for their convenient reference. Fig. 3 is a view showing one of the sheets or slips of a two-sheet file-section properly cut to be woven or locked together with another sheet of like construction. Fig. 4 is a view showing one step of locking two of the sheets or slips together of a two-sheet file-section. Fig. 5 is a view showing another step of locking the two sheets together. Fig. 6 is a view showing two of the leaves woven or locked together. Fig. 7 is a view of one of the sheets of a three-sheet file-section. Fig. 8 is a view showing the manner in which the first two sheets are locked together. Fig. 9 is a view showing the manner of connecting the third sheet of the two previously-locked sheets. Fig 10 is a view showing the manner of weaving. Fig. 11 is a perspective view showing a three-sheet file-section locked or woven together.

Like letters of reference indicate like parts in all the figures of the drawings, referring to which—

A designates the inclosing-case, preferably rectangular in form, and made of wood, pasteboard, or any other preferred material, and having a cover, A′, hinged or otherwise secured thereto.

B designates the file-sections, a number of which are adapted to be compactly stored in the case A, each section being numbered consecutively and provided with projecting tags or indexes *b*, preferably secured at their upper outer edges in any suitable manner. Each file-section B comprises, essentially, a base piece or board, *b′*, and two or more sheets—such as C C′, Figs. 4, 5, and 6, or D D′ D², Figs. 8, 9, 10, and 11—said sheets being connected together, as presently described, and secured to one edge of the base-board *b′* by means of glue, or in any other preferred manner.

To connect the sheets of the file-section securely together, and to prevent their loss or displacement from the section, I lock or weave them together at one of their edges or ends, leaving the other edge or end free. I take two sheets, C C′, to form a single file-section of paper, and cut them, as shown in Fig. 3 of the drawings—that is to say, each sheet is cut into a series of slips, *e*, the cuts extending from one side edge of the sheet nearly across the entire width of the sheet, as at *e′*, and terminating at a point, *h*, a short distance from the opposite side edge, as shown. The slips *e* are of equal width, and the cuts *e′* are equidistant from each other. Each of the slips is provided at the side edge, $e^2$, of the sheet, where it is connected to the adjacent section *e*, with one incision or notch, *f*, when but two sheets are to be connected or woven together, thus providing tongues *g* to each slip *e*; and in order to connect said sheets together they are laid one on top of the other, so that the notch *f* in the upper slip of the top sheet engages the notch or shoulder *h* between the upper slips of the adjacent or lower sheet, the top lying a short distance from the upper edge of the lower, as clearly shown in Figs. 4, 5, and 6. The second slip of the lower sheet is now bent over the second slip of the top section, so that the notched shoulder *h*, or notch between the first and second slips thereof, will interlock with the notch *f* of the second slip of the top sheet; thus assuming the position of the under sheet, and these successive movements of interlocking the notches *h* with the notches *f* of the tongues *g* to the slip *e* are repeated until the desired number of slips *e* are woven or connected together. This arrangement leaves the slips or sections of each sheet interlocked with and partially overlapping each other, being successively and alternately exposed for one-half their width on their upper edges and faces, as will be readily understood.

To weave or interlock three of the sheets together, each sheet D D′ $D^2$ is cut to provide the slips *i*, and at their connected edges each slip is provided with two spaced-apart incisions or notches, *j j′*, to provide tongues *k k′*. (See Fig. 7.) The second notch, *j′*, of the first or upper slip of the third underlying sheet, $D^2$, is interlocked with the notch *e*, between the first and second slips *i* of the second sheet, D′, thus causing the second notch, *j′*, of the upper slip *i* of the second sheet, D′, to register with the first notch, *j*, of the upper slip *i* of the third sheet. The inner edge, *l*, of the first slip *i* of the first sheet, D, is now inserted in the registering-notches *j j′* of the second and third sheets, D′ $D^2$, respectively, and the second or intermediate sheet, D′, is folded over, so that the inner edge, *l*, of the second slip *i* thereof rests in the registering-notches *j j′* of the second slip *i* of the two upper sheets, D $D^2$. The lower sheet, D, is now folded over, so that its notch *l* fits the registering-notches *j′ j²* of the sheets D′ $D^2$, thus causing each sheet and its contained slips to successively assume the positions of first, second, or intermediate, and third or bottom sheets, and when one of the said sheets constitutes the bottom sheet it is folded over its fellow-sheets to cause the inner edge, *l*, between its adjacent slips *i*, to fit in the registering-notches *j j′* of the slips *i* of the remaining sheets, and this method is continued until all the slips *i* have been locked or woven together.

The number of sheets employed can be varied to suit the requirements of the case, the number of incisions and tongues corresponding to the number of sheets employed, and the exposed face of each slip is designed to receive a letter, prescription, or the like, and is indexed and numbered, as shown in Fig. 1.

The sheets or pages after being woven together are secured to a base piece or board by means of mucilage, glue, or other devices, and the prescriptions are secured to the slips *e*, to leave a portion of the same exposed, and the slips are numbered consecutively from top to bottom, or vice versa, for convenient reference thereto.

If desired, the slips *e l* may be gummed or have a dried adhesive substance on their upper edges, to which the bills, letters, &c., may be quickly secured by moistening the said gummed portion.

Each file-section B may have covers B′ secured thereon in any preferred manner, and the base-board *b′* is provided on its under surface with one or more strips, $b^5$, of paste or straw board or other material, glued or otherwise secured thereon, the thickness of the strips being equal to the outer edge of the said board *b′*, thus causing the file-section B to be of equal depth or thickness at both edges, to present a neat appearance and fit closely and compactly within the inclosing-case A when stored away.

Each page may have one or more rows of slips, $b^2$, extending from the top toward the bottom thereof, and when it is desired to employ two rows the slips extend but half-way across the base-board, as is obvious.

In practice I prefer to employ four sheets, two of which are interlocked, as described, and extend half-way across the base-board, while the other two are similarly connected and occupy the remaining outer half of the base-board. Each sheet is provided with twenty-five slips, and, there being four sheets or pages, the file-section is thus capable of compactly receiving one hundred bills or prescriptions. Each section may be made with a greater number of pages, or the pages may contain a larger number of slips than that above described, and the case may be made sufficiently large to contain from ten to any higher number of sections. It will thus be seen that a prescription, bill, or other paper can be readily and quickly consulted, the number thereof having been first ascertained from an index-book, and the section containing that number having been withdrawn from the case A, the prescription can be readily found by merely turning the leaves of the section, each slip of the page being numbered, facilitating the finding thereof. By turning or folding over the slip below the one it is desired to consult the whole face of the bill or prescription is exposed to view, so that mistakes in putting up the compound will not be made by looking at another prescription, as frequently happens when the prescriptions are placed on a wire, rod, or file, where those above are liable to fall down. In my device there is but one prescription exposed to view, and that is the one that it is desired to consult.

It will be observed that a file constructed in accordance with my invention is simple, cheap, and durable, that the prescriptions, &c., can be readily and quickly filed away, and that they can be almost instantly found and consulted.

It will be understood that in weaving the several pages of the file-sections together the slitted slips of one page are caused to overlap the slitted slips of the other page or pages.

It should be borne in mind that the generic feature of my invention resides in providing a file with a series of independent slips, which are arranged in series or rows, said slips being secured at one side edge or end and left free at the top and bottom, and partially overlapping each other along the top, so as to leave an exposed surface on each of the slips, which surface is gummed.

I claim as my invention—

1. In a file, a file-section comprising two or more sheets or leaves cut transversely to form a series of slips, said sheets or leaves being secured together so that the slips of one sheet or leaf will overlap the slips of the other sheet or sheets, as set forth.

2. A file composed of a series of sections, each comprising a base-board forming a single page of the file, which page is made up of a series of short overlapping slips arranged one under the other, said slips being secured to the base-board and partially overlapping each other, so as to leave a portion of the slips exposed, to which exposed portion the part to be preserved is attached, as set forth.

3. In a file, a file-section comprising a base-board and two or more pages cut transversely nearly their entire width and interlocked at one of their edges and secured upon the base-board, substantially as described.

4. In a file of the class described, a section having a base-board and two or more pages secured at one of their edges thereto, the pages being cut into slips adapted to overlap one another and interlocked together at their edges, substantially as described.

5. As a new article of manufacture, a file-section comprising a base-board, two or more leaves or pages suitably secured at one edge thereto, and a protecting-cover, each page being cut transversely into slips and having a series of cuts adapted to interlock with the cuts on the slips of the adjacent page, substantially as described.

6. As a new article of manufacture, a file-section comprising a base-board having a strip, $b^5$, a series of leaves or pages arranged in two rows longitudinally of the base-board and secured thereto at one of their edges, and a cover, the leaves or pages of each row being cut transversely into slips adapted to overlap one another, and each leaf or page having a series of cuts at one of its edges, which are adapted to interlock with the next page, substantially as described.

7. In a file, the combination, with an inclosing-case, of a series of file-sections, each file-section having two or more leaves locked together at one of their edges and having a series of overlapping slips, which are adapted to receive a bill, &c., substantially as described.

8. As an article of manufacture, a file comprising an inclosing-case and a series of consecutively-numbered file-sections normally inclosed within the case, each file-section having a cover and two or more pages interlocked together at one of their edges and having a series of overlapping slips to receive a bill, prescription, and the like, substantially as described.

9. A file-section comprising a base and two or more sheets interlocked together at one of their edges and provided with overlapping slips to receive a bill, letter, and the like, substantially as described.

In testimony that I claim the foregoing as my own I have hereto affixed my signature in presence of two witnesses.

ERNEST ALBERT KITTELL.

Witnesses:
CARL B. MILLER,
A. B. THOMAS.